INVENTORS.
THEODORE SWEDLOW
SVEND SONDERGAARD
BY JAN DE SWART

*Christie, Parker & Hale*
ATTORNEYS.

Sept. 19, 1961 T. SWEDLOW ET AL 3,000,057
METHOD FOR THE MANUFACTURE OF THREE-DIMENSIONAL OBJECTS BY
SELECTIVELY HEATING PLASTIC SHEETS
POSSESSING ELASTIC MEMORY
Filed May 10, 1957 2 Sheets-Sheet 2
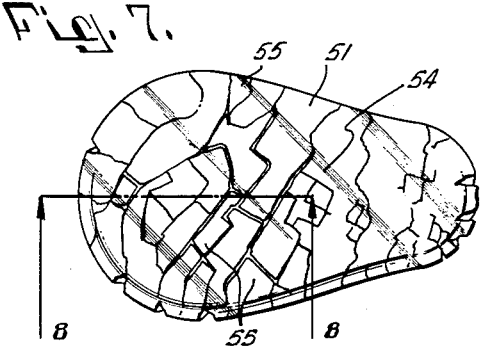
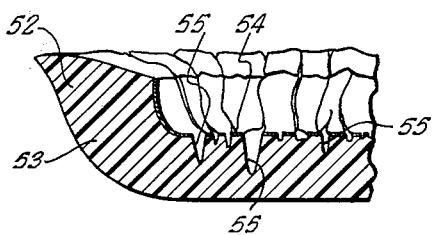
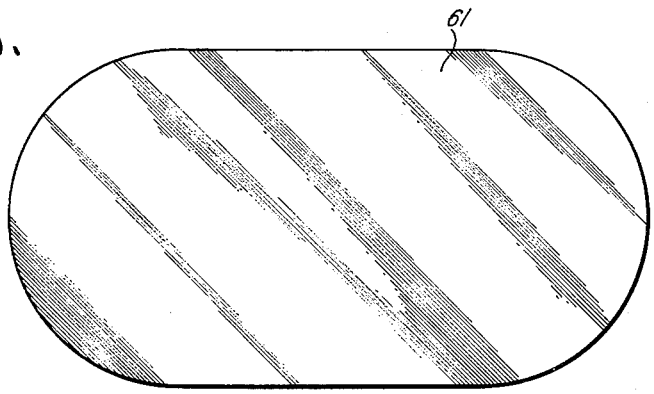
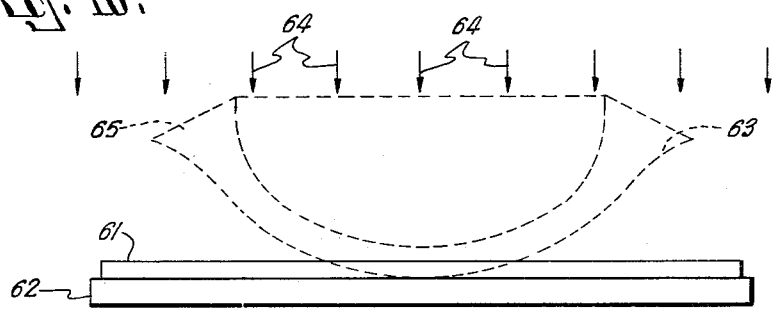
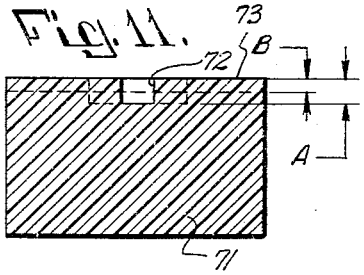
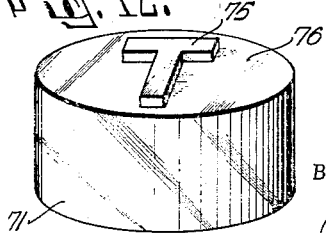
INVENTORS.
THEODORE SWEDLOW
SVEND SONDERGAARD
BY JAN DE SWART
Christie, Parker & Hale
ATTORNEYS.

United States Patent Office 3,000,057
Patented Sept. 19, 1961

3,000,057
METHOD FOR THE MANUFACTURE OF THREE-DIMENSIONAL OBJECTS BY SELECTIVELY HEATING PLASTIC SHEETS POSSESSING ELASTIC MEMORY
Theodore Swedlow, 628 Alameda St., and Svend Sondergaard, 575 Stonehurst Drive, both of Altadena, Calif., and Jan De Swart, Los Angeles, Calif.; said De Swart assignor to said Swedlow and said Sondergaard
Filed May 10, 1957, Ser. No. 658,387
3 Claims. (Cl. 18—48)

The invention relates to methods for forming three-dimensional objects from materials having resiliency characteristics which render the materials unstable dimensionally in certain temperature ranges and to products resulting from such methods.

Certain materials have the characteristic of being dimensionally stable at normal temperatures after having been stressed so as to have different dimensions from when originally manufactured. An exemplary material is Plexiglas. When stressed by stretching, Plexiglas has strength characteristics which are desirable in many uses. Other materials like Plexiglas benefit mechanically from the stresses induced by the stretching process. Materials such as the polyester plastics, styrenes and particularly the Plexiglases known as Plexiglas #55 and Plexiglas #2 have a quality called "memory." Materials with "memory" tend to return to their original dimensional form when heated to a critical temperature. For instance, a flat sheet of Plexiglas having an original thickness of 1" may be changed by the stretching process to a differently dimensioned sheet having a thickness of 3/8".

Under normal temperatures this 3/8" thickness and the length and width dimensions of the sheet are static. However, if the stretched plastic is heated uniformly to a temperature in the range slightly above 200° F. for a time period sufficiently long for the material to reach a uniform temperature, the characteristic called "memory" tends to result in a physical restitution of the heated stretched plastic to its original dimensions. The process of the invention puts to use this memory characteristic of stressed materials.

In addition to the stressing caused by a stretching of the plastic material, the memory characteristic may be utilized in materials stressed by compressive force applied to areas of the original material or to materials stressed by an extruding process shaping the original material into any one of many configurations.

The major manufacturing cost of most plastic articles is represented by the cost of forming molds and dies. Also, despite the plasticity of this class of materials, some shapes or configurations such as those having undercut cavities require dies of such complication as to make the shapes commercially prohibitive. The process of the invention accomplishes the economical production of undercut cavities and other similarly difficult configurations at costs within the scope of commercial feasibility. Economical manufacture is possible because the process of the invention eliminates expensive molds and dies.

The process affords unique articles of manufacture. Such articles are produced from a resilient material having memory characteristics without the use of a mold and comprise objects formed from a stressed material having a capacity for reverting to the previously unstressed condition of the material. The material has been caused to revert to its previously unstressed condition in selected areas to produce the desired shape for the object.

The invention contemplates a process embodying the steps of stressing a resilient material having structural memory characteristics and shaping the stressed material to a predetermined pattern. The patterned material is then subjected to heat within a selected temperature range. The applied heat causes the shaped material to tend to revert to its unstressed condition. Selected portions of the material are restrained from reverting and the entire shaped material is reduced in temperature to a stable range when the desired amount of shape change has taken place.

The form of restraint imposed upon selected portions of the stressed material may be either physically imposed restraint upon the material or be a restraint caused by the shielding of the selected portion from the applied heat.

The material may be stressed by stretching, extruding or direct compression. The applied heat may be directed to selected portions of the shaped material so that the tendency to reversion differs in different portions of the material. The applied heat may vary in temperature in various portions of the shaped material to still further vary the reverting tendency of the stressed material.

Experiments with Plexiglas #55 show enormous distorting power resulting from the memory characteristic. Heretofore this power has not been utilized. The process of the invention channels this power to re-shape the stressed material without the use of expensive molds or dies.

Surface texture can be induced in stressed or stretched material by the direct application of intense heat. The temperature range inferred by the term "intense" is from 350° F. upward. If a flame such as that from a propane torch is applied to a localized area of a stretched material, a pattern of shallow fissures resembling etching results. Many different etched patterns can be achieved by controlling the time the flame is applied to the material and the distance from which the flame is applied.

Deep etching exemplified by major fissures is induced in the stretched material by exposing the material to continuing heat in excess of 350°. Fissures induced by this degree of heat extend to varying depths through the material thickness. This degree of heat also accelerates the tendency of the stretched material to revert to the original state. However, the stresses which usually result in a gradual and uniform reversion of the substance or material induce a less uniform reversion because of stress imbalance resulting from the fissures induced by the rapid strain imposed by the more intense heat. Therefore, more distortion and irregularity of configuration results from exposure of the stretched material to heat under 300° F.

The process of the invention may be combined with surface pigmentation and when used with transparent or translucent materials this combined process affords color mutations not readily obtainable by any other method. Pigment applied to the surface of the stressed material either before or after heating is changed in pattern by the dimensional change experienced by the material in reverting to its original form. Depending upon the amount of reversion and its uniformity, color patterns differing from that applied to the surface originally result from material surface migration and the heat effect upon the pigment. The varying thicknesses which may be induced in transparent plastics also produce optical effects which enhance the pigmentation of the material.

Other varying artistic appearances may be achieved by combining deep fissures and surface coloration. Pigment may be applied to the surface before the application of heat. The surface is then broken into colored patches defined by deep fissures. A different effect is achieved by filling the fissures with pigment after heating and leaving the surface the natural color of the material.

Further advantages of the process and the objects resulting from the process are apparent in the following detailed description and drawings, in which:

FIG. 7 is a plan view illustrating the patterned effect given to an object treated in accordance with the process to induce deep fissures;

FIG. 8 is a sectional elevation taken along line 8—8 of FIG. 7 showing the depth of fissuring obtainable;

FIG. 9 illustrates a flat sheet of resilient material shaped to give a desired configuration when treated in accordance with the process of the invention;

FIG. 10 illustrates a spherical dome or lens formed from the flat sheet of FIG. 9;

FIG. 11 is a sectional elevation of an object stressed by partial compression; and FIG. 12 is a perspective view of the object of FIG. 11 after reversion has been induced.

The process of the invention results in many products varying from ornamental objects to utilitarian three-dimensional shapes such as observation domes, lighting fixtures and furniture. For the purposes of illustration, smaller simple objects are described. The process of the invention is limited practically only by the size of material commercially available and the size limitations of heat sources for applying uniform heat.

Figure 1:
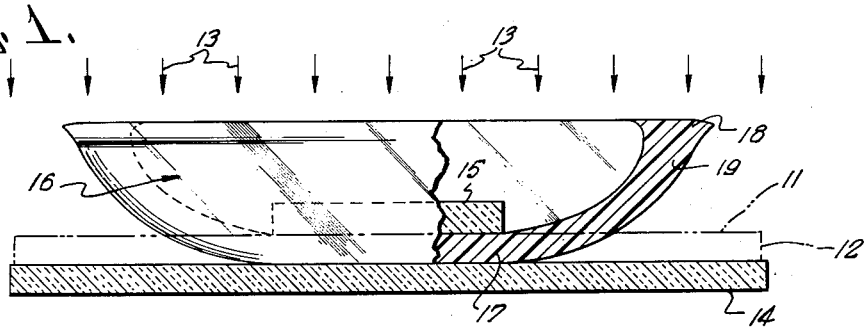
FIG. 1 is an elevational view partly in section illustrating an article of manufacture resulting from the process and the method of forming such a symmetrical object by the process of the invention.

FIG. 1 illustrates graphically a preferred embodiment of the inventive process. A blank 11 of pre-stretched resilient material having memory characteristics is represented by phantom lines. The blank is circular in shape and has a polished peripheral rim 12. The blank is exposed to heat from a source above the blank, the heat being represented by a plurality of arrows 13. The blank rests upon a disk 14 of a material having a low heat absorption rate. Disk 14 is preferably slightly larger than the blank. A shield 15 of similar material rests upon the central area of the blank.

Heating of the blank in accordance with the process of the invention results in a bowl 16. The diameter of the blank is slightly less than the sum of the desired bowl diameter plus the bowl height. The shield preferably has a diameter somewhat less than a desired flat area 17 of the bowl. The shaped blank, the shield and the disk are placed in an oven in the illustrated orientation and exposed to a temperature of approximately 250° F. This temperature is maintained for approximately one hour. Then the temperature is raised to about 300° F. At this latter temperature a definite tendency of the material to revert to its pre-stretched configuration exerts itself.

The heat indicated by arrows 13 impinges more strongly on the upper unshielded surface of the blank. The upper surface therefore tends to expand in thickness at the expense of radial length. For example, if the original material had been a 1" thick sheet stretched to a ⅜" thickness, the heat incites a tendency of the material in the area heated to revert to its 1" thickness. The more intensely heated upper surface tends to contract inwardly longitudinally with respect to the center of the blank causing the area of the blank outside the shielded surface to curve upwardly. As the blank curves upwardly, more surface area in the vicinity of the blank periphery is exposed to heat. This results in a more rapid reversion of the peripheral area to its original thickness. The accelerated reversion results in a thickened rim 18 bounding the upwardly and inwardly curving side wall 19 of the bowl.

When the bowl has reached the desired configuration, it is removed from exposure to the heat. Air cooling is rapid enough so that no further tendency to revert exerts itself after the object is no longer exposed to heat. If further processing is immediately desirable, the object may be quenched in water to reduce its temperature quickly for easy handling.

The temperatures described with respect to the process illustrated in FIG. 1 are illustrative. Similar results may be obtained by exposing material to a temperature above 200° F. for a longer time. The heat may also be increased at an earlier time and be of a greater intensity. However, the illustrative temperatures are optimum from a manufacturing standpoint.

Figure 2:
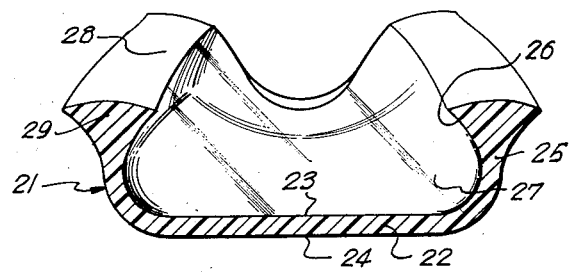
FIG. 2 is a sectional elevation illustrating an object having an undercut cavity capable of being formed without molds by the process of the invention.

FIG. 2 illustrates an artistic object 21 having a flat bottom area 22 with parallel upper and lower surfaces 23 and 24 respectively. An upwardly extending side wall 25 curves inwardly at its top to form an overhanging lip 26 having a lesser diameter than the major diameter of a cavity 27 defined by the bottom area and the side wall. Object 21 has a so-called undercut cavity. Such cavities are very difficult to form by conventional molding processes. Side wall 25 expands into a considerably thickened rim 28 of irregular configuration.

The process for forming the object of FIG. 2 is similar to the process used in forming the symmetrical bowl of FIG. 1. The material of the object is stretched to form a sheet having a lesser thickness than the original stock. The lesser thickness is maintained in bottom area 22 by shielding both top and bottom surfaces from the heat applied. The area is thus restrained from reverting to the original state of the material. The use of a bottom shield is not essential if the heat source is controlled so that all heat impinges downwardly on the top surface of the object.

Heat is applied to the object of FIG. 2 for a longer period than for the object of FIG. 1. Similar results may be obtained by greater heat intensity for a shorter period. Heat application is continued until side wall 25 curves inwardly enough to form the undercut cavity. More of the surface surrounding the peripheral area 29 of the object is exposed to the applied heat. This exposure is for a longer period and a relatively complete reversion to the original state of the material is accomplished. Thus, peripheral area 29 has reverted to substantially the same thickness as the original material had.

While the heat source need not be confined to a location above the surface of the object, the heat should be of greater intensity on that side of the material toward which a curving of the material is desired. Rim 28 may either be smooth or rough depending upon how the blank was shaped and whether or not the periphery of the blank was polished. The marks resulting from the shaping tool may be left so that the finished rim has a rough surface contrasting with the smooth exterior of the object itself.

Figure 3:
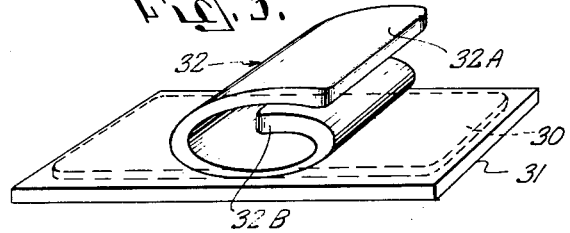
FIG. 3 is a perspective view illustrating graphically an extension of the process of FIG. 1.

In FIG. 3 a rectangular blank 30 (shown in dotted lines) of the proper pre-stretched material rests upon a heat shield 31. A scrolled object 32 can be made from the flat rectangular blank by the following process:

Uniform heat in the range slightly above 200° F. is applied to blank 30. Application of such heat continues until the blank has absorbed enough heat for the first indication that the tendency to revert to its original dimensional state has started. Then the blank is placed upon the shield and intense heat is applied from a single direction. The intense heat is in the range from 350° F. upward.

Greater heat accelerates the tendency of the prestressed pre-heated material to revert to its original state.

Because the heat is applied from one direction the material tends to curve upwardly toward the heat source for the reasons mentioned earlier in the general disclosure. The ends of the rectangular blank migrate far enough to overlap each other. In the illustrated object an end 32A overlaps an opposite end 32B. Once the amount of overlap desired is attained, the object is cooled to arrest the tendency to revert.

If heat were applied for a long enough period, the stresses in the object induced by uneven heating of the object would equalize and the object would flatten out again, but in a rectangle having the thickness of the original unstretched sheet.

Care must be taken that proper preheating is attained or the stresses induced by the second, or intense, heating result in fissuring of the material.

The process described with respect to FIG. 3 results in a product of configuration beyond conventional mold and die processes.

Figure 4:
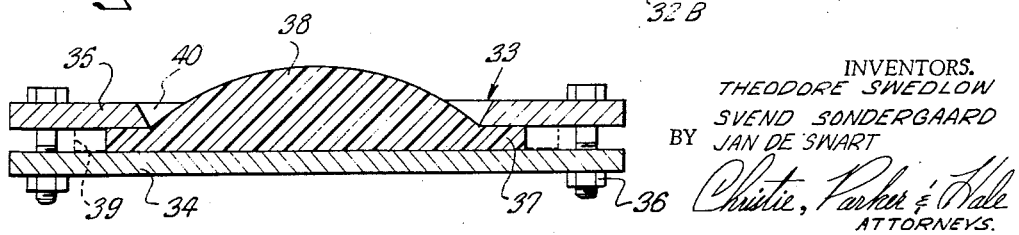
FIG. 4 is a sectional elevation illustrating a method of making a convex lens by restraining stressed material.

The objects of FIGS. 1 and 2 are shaped by a method utilizing heat shields to restrain certain areas of the object from reverting to the original configuration of the material from which the objects were made. This is the preferred method for the practice of the invention. FIG. 4 illustrates a method in accordance with the process of the invention in which physical force is imposed upon certain areas of the blank from which the object is shaped to restrain those areas from reverting to the original material configuration.

In FIG. 4 a restraining frame 33 comprising a lower plate 34 and an upper plate 35 clamped together by a plurality of bolt and nut pairs 36 restrains the outer area 37 of a lens 38. Lens 38 is formed from a pre-stretched blank whose original configuration is indicated by dotted lines 39. The blank is of a material such as Plexiglas #55 which has a memory characteristic. The material has been stretched to a lesser thickness than the original stock possessed. The blank is clamped within frame 33 so that an area of the upper surface of the blank is outlined by an opening 40 in upper plate 35. If a semi-spherical lens is desired, opening 40 is circular.

Heat from a source above the exposed surface of the blank is applied to the blank for a period commensurate with the degree of reversion desired. A temperature above 200° F. results in a tendency of the central area to revert to its original dimension. Physical restraint of the outer area of the blank substantially maintains the stretched thickness dimension in that area. Allowance should be made for some slippage between the restrained area and the clamping plates. The unrestrained central area rises in a gradual spherical curve to form a convex lens. By controlling the amount of heat absorbed by the blank, the amount of curvature desired may be attained. A convex lens of high resolving power may be thus manufactured without resorting to tedious molding and grinding.

Figure 5:
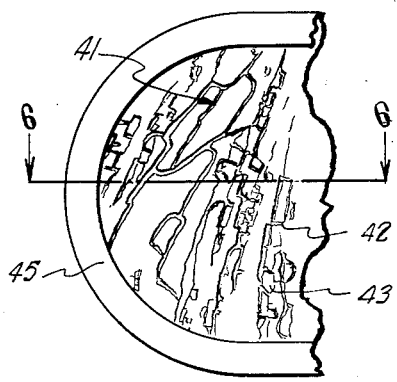
FIG. 5 is a plan view illustrating an etched pattern achieved by the localized application of intense heat to a piece of resilient material.
Figure 6:
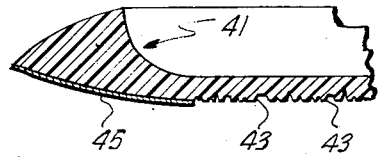
FIG. 6 is a sectional view taken along line 6—6 of FIG. 5 illustrating the shallow depth of the fissures so created.

FIGS. 5 and 6 illustrate an object whose exterior surface has been decorated by the process of the invention to simulate an etched pattern. In the figures a shallow tray 41 of a pre-stretched material has an outer surface 42 having an etched pattern formed by shallow fissures 43 running at random in the surface. The configuration of the tray is preferably achieved by a process similar to that described for the FIGURES 1 and 2.

The pattern exterior is achieved by applying intense heat in a localized area. For instance, the fissures 43 result from the extreme stress induced by the tendency of the material to revert to its original unstretched state in a period of time too short for the area immediately adjacent the locally heated area to compensate for the structural change taking place. Areas which are to remain smooth and free of pattern may be shielded from the heat by a mask 45. In the case of tray 41 the mask extends about the edge of surface 42 so that the etched pattern appears to be framed by a smooth band.

A different artistic effect is achieved if the shaped blank is placed, when cold, into an oven whose temperature is relatively high. FIGS. 7 and 8 illustrate an ornamental dish 51 made from a shaped blank of previously stretched Plexiglas. If such a blank is put into an oven preheated to a temperature of about 450° F., the blank shapes rapidly into a shallow dish having a thick rim 52 and a curving side 53. The basic configuration, resulting from the heat-induced assertion of the memory characteristic inherent in the material, is largely determined by the shaping of the blank. However, the surface pattern induced by the application of heat to the upper surface 54 of the blank results in a multiplicity of deep fissures 55 due to the release of stresses induced by the relatively high heat. By varying the temperature and localizing the heat application, many different patterns may be achieved.

Pigmentation of objects made in accordance with the process of the invention affords opportunity for unique color patterns not easily available by any other method. In three-dimensional objects pigments combining various colors may be applied to either inner or outer surfaces of the objects. The pigment may be applied at any stage of the process, the stage selected determined by the effect desired.

When used in conjunction with the deep fissuring process illustrated by the dish of FIGS. 7 and 8, a pleasing effect results from the application of vari-colored pigment to the inner surface of the dish prior to the fissuring step. In FIG. 8 a pigment layer 57 covers the inner surface of the dish. The pigment changes its pattern as the material tends to revert to its original state. The pigmented areas migrate as the inner surface contracts or expands under the stresses induced by the reverting propensity. In the illustrated instance the division of the pigmented area into polygons defined by the clear line of the fissures gives a tortoise-shell effect.

The heat causes physical change in the pigment. Such changes affect both the color and texture of the pigmented pattern. By varying the stage of the processes at which the pigment is applied, a practically unlimited number of color patterns may be achieved.

The process of the invention is adaptable to the manufacture of semi-spherical or dome-shaped objects. FIG. 4 illustrates a lens with a semi-spherical shape. However, if uniform heat is applied to one surface of a shaped piece of pre-stretched material and no part of that material is shielded or otherwise restrained, a flat blank tends to curve upwardly and assume a hemispherical configuration.

Lenses may be shaped in this manner as well as by the method illustrated in FIG. 4 without tedious grinding. Since the reversion of the material may be halted at any stage by rapidly cooling the object, a desired lens configuration can be arrived at with only a fraction of the manufacturing cost incurred in conventional lens casting and grinding.

FIG. 9 illustrates a blank 61 of a pre-stretched material having memory characteristics. The blank has the general configuration of an elongated oval. Assuming that it is desired to shape the blank into a hemispherical dome-like shape, the blank is placed on a plate 62 of low heat absorbing qualities. Heat is applied to the exposed surface of the blank causing it to curve upwardly in the configuration indicated by the dotted line 63. As the rim of the object so formed curves upwardly toward the heat source indicated by arrow 64, more surface area in the vicinity of rim 65 is exposed to heat absorption. Thus, this area exerts a more rapid reversion to the original dimensions of the material and the rim is thickened. The object resulting from the method illustrated in FIG. 10 may be used as a reducing lens. Varying shaped blanks processed by this method will result in semi-spherical objects having many uses. FIGS. 11 and 12 depict a cylindrical block 71 of unstressed material having memory characteristics. A central area of the block has been compressed to form a T-shaped indentation 72. The indentation is preferably formed by pressing a heated T-shaped die against surface 73 of the block. The compression of the material immediately surrounding and below the indentation results in that area being in a stressed condition.

If the indentation is of a depth A and the block is shaped by cutting off the upper portion to a depth B, heating of the block in a temperature range slightly above 200° F. results in the tendency of the stressed area to revert to its previous unstressed dimension. Thus, a raised T-shaped embossment 75 stands out above new block surface 76 formed by the re-shaping of the block.

The thickness of the wafer removed in the re-shaping of the block determines the height above the new top surface that the embossed pattern will have.

Only a few of the many applications of the process and the products resulting therefrom have been described. The ultimate configuration achieved by use of the process is determined by the shape of the material after the original stock has been stressed, by the shaping of the stressed material, the way in which the material is restrained when heated and the manner of heat application. With all of these variables the ultimate configuration possible is seemingly limited only by the dimensional difference between the unstressed material and the material dimensions after stressing. The process lends itself equally to the fields of architecture, ornamentation and industry. The potentialities of the process have been only indicated by the illustrative embodiments. The ornamental techniques made possible by the pigmenting of stressed material surfaces afford color and pattern mutations of almost unlimited scope.

The heat application step is also flexible. The range of temperatures utilized is variable and the areas to be heated may be selected in accordance with the desired final configuration. Many procedural variations of the illustrative process will be apparent to those acquainted with the field of the art without departing from the scope of the invention.

We claim:

1. A process for forming objects from a polymeric material in selected shapes without the use of a mold comprising stretching a polymeric material having a capacity for reverting to its previous unstretched condition, shaping the stretched material to a predetermined shape, applying heat in a selected temperature range to selected portions of the shaped material to cause these portions of the material to tend to revert to their unstretched condition, applying localized surface heat to induce shallow fissures in the object surface to give an ornamental appearance, and reducing the temperature of the material to the temperature at which the material is stable when the desired amount of change of shape of the heated portion of the material has taken place.

2. A process for forming objects into selected decorated shapes from a polymeric material without the use of a mold comprising stressing a polymeric material having a capacity for reverting to its previous unstressed condition, shaping the stressed material to a predetermined shape, applying heat of a selected temperature in the range intense enough to cause areas of the material to tend to revert rapidly to their unstressed condition in such a manner that the stresses induced by the reverting tendency result in a random rupturing of the surface areas, applying heat of a reduced temperature until the tendency to revert to the unstressed condition has achieved the desired amount of change of shape, and then reducing the temperature of the material to the temperature at which the material is stable.

3. A process for forming objects into selected colored decorated shapes from a polymeric material without the use of a mold comprising the steps of stressing a polymeric material having a capacity for reverting to its previous unstressed condition, shaping a blank from the stresser material to a predetermined configuration, applying pigment to selected surface areas of the shaped material, applying heat in a selected temperature range to cause the shaped material to tend to revert to its unstressed condition and so that the pigmented surface areas are modified, and reducing the temperature of the material to within the range at which the material is stable when the desired amount of change of shape and of pigment pattern of the material has taken place.

References Cited in the file of this patent

UNITED STATES PATENTS

| | | |
|---|---|---|
| 2,027,961 | Currie | Jan. 14, 1936 |
| 2,027,962 | Currie | Jan. 14, 1936 |
| 2,145,887 | Moss et al. | Feb. 7, 1939 |
| 2,217,451 | Patnode | Oct. 8, 1940 |
| 2,234,994 | Vernon et al. | Mar. 18, 1941 |
| 2,260,517 | Hamilton | Oct. 28, 1941 |
| 2,368,085 | Barbieri | Jan. 30, 1945 |
| 2,422,325 | Wheelan | June 17, 1947 |
| 2,502,240 | Wiley | Mar. 28, 1950 |
| 2,511,024 | Toulmin | June 13, 1950 |
| 2,588,571 | Porter | Mar. 11, 1952 |
| 2,649,618 | Rhodes et al. | Aug. 25, 1953 |
| 2,766,555 | Jendrisak et al. | Oct. 16, 1956 |